United States Patent
Uchino et al.

(10) Patent No.: US 11,963,251 B2
(45) Date of Patent: Apr. 16, 2024

(54) NETWORK NODE AND COMMUNICATION SYSTEM

(71) Applicant: NTT DOCOMO, INC., Tokyo (JP)

(72) Inventors: Tooru Uchino, Tokyo (JP); Teruaki Toeda, Tokyo (JP); Anil Umesh, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/650,095

(22) PCT Filed: Sep. 26, 2018

(86) PCT No.: PCT/JP2018/035739
§ 371 (c)(1),
(2) Date: Mar. 24, 2020

(87) PCT Pub. No.: WO2019/065759
PCT Pub. Date: Apr. 4, 2019

(65) Prior Publication Data
US 2020/0314945 A1 Oct. 1, 2020

(30) Foreign Application Priority Data
Sep. 28, 2017 (JP) ................................ 2017-189214

(51) Int. Cl.
*H04W 76/30* (2018.01)
*H04W 76/27* (2018.01)
(Continued)

(52) U.S. Cl.
CPC ........... *H04W 76/27* (2018.02); *H04W 76/30* (2018.02); *H04W 80/02* (2013.01); *H04W 80/08* (2013.01); *H04W 92/20* (2013.01)

(58) Field of Classification Search
CPC ..... H04W 76/27; H04W 76/30; H04W 80/02; H04W 80/08; H04W 92/20; H04W 76/12;
(Continued)

(56) References Cited

U.S. PATENT DOCUMENTS

2014/0369198 A1* 12/2014 Rinne .................. H04L 47/34
370/235
2016/0219475 A1* 7/2016 Kim ..................... H04W 28/08
(Continued)

FOREIGN PATENT DOCUMENTS

| JP | 2015510731 A | 4/2015 | |
| JP | 20155107331 A | * 4/2015 | ............ H04W 74/08 |
| WO | 2017010693 A1 | 1/2017 | |

OTHER PUBLICATIONS

ETSI (ETSI MCC: "Report of 3GPP TSG RAN3 ad hoc meeting NR#02, Qingdao, P.R. China, Jun. 27-29, 2017", 3GPP Draft; R3-172652-REPORT-RAN3-NR#02, 3rd Generation Partnership Project (3GPP), Mobile Competence Centre ; 650, Route Des Lucioles).*
(Continued)

*Primary Examiner* — Lakeram Jangbahadur
(74) *Attorney, Agent, or Firm* — Osha Bergman Watanabe & Burton LLP

(57) ABSTRACT

A network node that is a second network node connected to a user device and a first network node includes: a control unit that acquires information regarding a layer which is terminated at the user device and the second network node; and a transmission unit that transmits the information regarding the layer to the first network node. The layer is not terminated at the user device and the first network node.

2 Claims, 8 Drawing Sheets

(51) Int. Cl.
*H04W 80/02* (2009.01)
*H04W 80/08* (2009.01)
*H04W 92/20* (2009.01)

(58) Field of Classification Search
CPC ... H04W 88/12; H04W 88/085; H04W 16/32; H04W 76/10; H04W 80/085
See application file for complete search history.

(56) References Cited

U.S. PATENT DOCUMENTS

| | | | | |
|---|---|---|---|---|
| 2017/0359848 | A1* | 12/2017 | Tenny | H04W 36/023 |
| 2018/0213579 | A1* | 7/2018 | Hong | H04W 76/10 |
| 2019/0132790 | A1* | 5/2019 | Lee | H04W 48/18 |
| 2019/0150220 | A1* | 5/2019 | Byun | H04W 76/10 370/329 |
| 2020/0228964 | A1* | 7/2020 | Toeda | H04W 16/26 |

OTHER PUBLICATIONS

NTT (NTT Docomo et al: "New Radio (NR) Access Technology", 3GPP Draft; RP-171505 SR ON NR-WID, 3rd Generation Partnership Project (3GPP), Mobile Competence Centre ; 650, Route Des Lucioles ; F-06921 Sophia-Antipolis Cedex; France, vol. TSG RAN, No. West Palm Beach, USA; Jun. 5, 2017-Jun. 8, 2017 Jun. 8, 2017 (Jun. 8, 2017.*

CATT (CATT: "Response to R3-171171", 3GPP Draft; R3-171259, 3rd Generation Partnership Project (3GPP), Mobile Competence Centre ; 650, Route Des Lucioles; F-06921 Sophia-Antipolis Cedex; France, vol. RAN WG3, No. Spokane, USA; Apr. 3, 2017-Apr. 7, 2017 Apr. 3, 2017).*

3GPP TS 38.401 V0.2.0; "3rd Generation Partnership Project; Technical Specification Group Radio Access Network; NG-RAN; Architecture description (Release 15)" Jul. 2017 (20 pages).

3GPP TSG-RAN3 Meeting #97; R3-173114 "Fast retransmission of lost PDUs" Huawei; Berlin, Germany; Aug. 21-25, 2017 (3 pages).

3GPP TSG RAN WG3 #92; R3-161267 "NR RAN functional description" CMCC; Nanjing, China; May 23-27, 2016 (6 Pages).

International Search Report issued in International Application No. PCT/JP2018/035739, mailed Dec. 18, 2018 (4 bages).

Written Opinion issued in International Application No. PCT/JP2018/035739; dated Dec. 18, 2018 (4 pages).

3GPP TSG RAN meeting #76; RP-1711505 "New Radio (NR) Access Technology" NTT Docomo, Inc.; West Palm Beach, USA; Jun. 5-8, 2017 (218 pages).

3GPP TSG RAN meeting #97; R3-172652 "Report of 3GPP TSG RAN3 ad hoc meeting NR#02" ETSI MCC; Spokane, USA; Apr. 3-7, 2017 (166 pages).

3GPP TSG-RAN WG3 Meeting #95-bis; R3-171171 "Centralised retransmission of PDCP PDUs for option 2: discussion and simulation" Ericsson; Spokane, Washington, USA; Apr. 3-7, 2017 (10 pages).

Extended European Search Report issued in European Application No. 18863207.9, dated Apr. 21, 2021 (13 pages).

Office Action issued in European Application No. 18863207.9 dated Dec. 16, 2022 (8 pages).

Office Action issued in Chinese Application No. 201880062618.7 dated Jan. 18, 2023 (31 pages).

Huawei; "Fast retransmission of lost PDUs"; 3GPP TSG-RAN3 Meeting #97, R3-173114; Berlin, Germany; Aug. 21-25, 2017 (3 pages).

Huawei; "RRC message transfer"; 3GPP TSG RAN WG3 Meeting #97, R3-173117; Berlin, Germany; Aug. 21-25, 2017 (3 pages).

CMCC; "NR RAN functional description"; 3GPP TSG RAN WG3 #92, R3-161267; Nanjing, China; May 23-27, 2016 (6 pages).

Office Action issued in Mexican Application No. MX/a/2020/007160 dated Aug. 10, 2023 (4 pages).

* cited by examiner

NETWORK NODE AND COMMUNICATION SYSTEM

TECHNICAL FIELD

The present invention relates to a network node and a communication system.

BACKGROUND ART

In 3rd Generation Partnership Project (3GPP), a radio communication scheme (hereinafter, the radio communication scheme is referred to as "5G" or an "NR") called 5G or new radio (NR) has been examined in order to realize a more increase in a system capacity, more acceleration of a data transmission speed, a lower delay in a radio section, and the like. In the NR, various radio technologies have been examined in order to satisfy a requirement condition that delay of a radio section is set to 1 ms or less while realizing a throughput of 10 Gbps or more.

In 5G, division of functions between a central unit (CU or centralized base station) and a distributed unit (DU or a remote station) in a radio network architecture has been reexamined (for example, see Non-Patent Document 1).

CITATION LIST

Non-Patent Document

Non-Patent Document 1: 3GPP TS 38.401 V14.3.0 (2017 July)

SUMMARY OF THE INVENTION

Problem to be Solved by the Invention

In the radio network architecture of 5G, nodes are separated into a CU and a DU. Since a layer structure closed in one node is separated between CU-DU in the layer structure of the related art, it is necessary to perform appropriate control in accordance with each layer state.

The invention is devised in view of the foregoing circumstances and an object of the invention is to perform appropriate control in accordance with a layer state between nodes in a radio network architecture.

Means for Solving Problem

According to the technology of the disclosure, a network node is a second network node connected to a user device and a first network node. The network node includes: a control unit that acquires information regarding a layer which is terminated at the user device and the second network node; and a transmission unit that transmits the information regarding the layer to the first network node. The layer is not terminated at the user device and the first network node.

Effect of the Invention

According to the technology of the present disclosure, it is possible to perform appropriate control in accordance with a layer state between nodes in a radio network architecture.

MODE(S) FOR CARRYING OUT THE INVENTION

Hereinafter, embodiments of the invention will be described with reference to the drawings. Note that embodiments to be described below are exemplary and the embodiments to which the invention is applied are not limited to the following embodiments.

In an operation of a radio communication system according to the embodiment, a known technology is appropriately used. Here, the known technology is, for example, known LIE, but the invention is not limited to the known LTE. The term "LTE" used in the present specification is assumed to have a broad meaning including LTE-Advanced and a scheme (for example, 5G or an NR) subsequent to LTE-Advanced unless otherwise stated. LTE or LTE-Advanced may be called "4G."

In an embodiment to be described below, terms such as a synchronization signal (SS), a primary SS (PSS), a secondary SS (SSS), a physical broadcast channel (PBCH), a physical RACH (PRACH), a physical downlink control channel (PDCCH), and a physical downlink shared channel (PDSCH) used in the known LTE will be used. However, the same signals, functions, and the like as these may be called other names to facilitate the description. The above-described terms in the NR correspond to an NR-SS, an NR-PSS, an NR-SSS, an NR-PBCH, an NR-PRACH, an NR-PDCCH, an NR-PDSCH, and the like.

Figure 1:
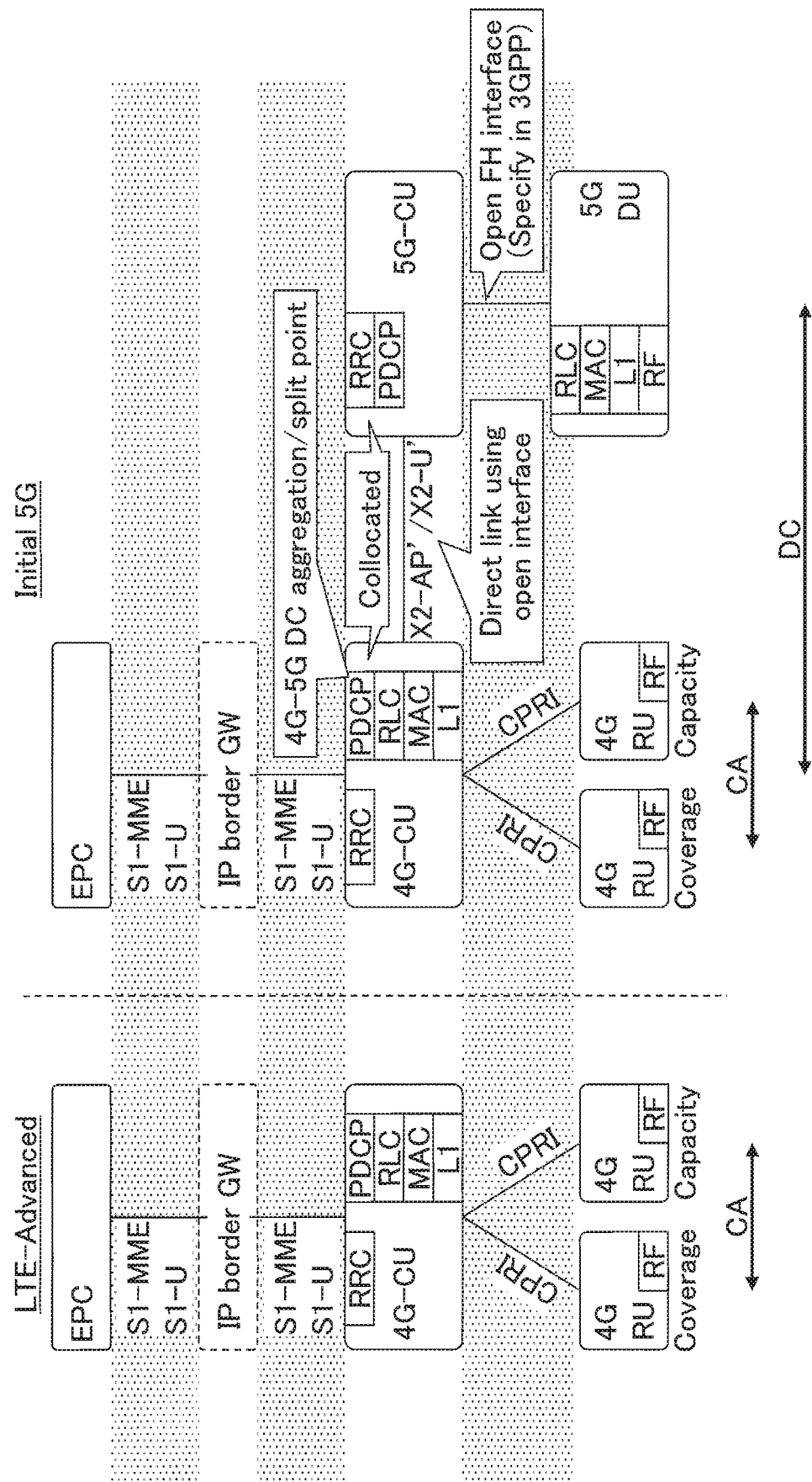
FIG. 1 is a diagram illustrating a structure example of a radio network architecture according to an embodiment of the invention.

FIG. 1 is a diagram illustrating a structure example of a radio network architecture according to an embodiment of the invention. The radio network architecture according to the embodiment of the invention includes a 4G-CU, a 4G-remote unit (RU or a remote radio station), an evolved packet core (EPC), and the like in LTE-Advanced, as illustrated in FIG. 1. On the other hand, a radio network architecture in 5G includes a 4G-CU, a 4G-RU, a 5G-CU (hereinafter, referred to as a CU 100), a 5G-DU (hereinafter, referred to as a DU 200), an EPC, and the like.

As illustrated in FIG. 1, the 4G-CU includes layers of a radio resource control (RRC), a packet data convergence protocol (PDCP), a radio link control (RLC), a medium access control (MAC), a layer 1 (L1, a PHY layer, or a physical layer) and is connected to the 4G-RU via a common public radio interface (CPRI).

On the other hand, as illustrated in FIG. 1, the CU 100 includes the RRC layer and is connected to the DU 200 via an FH interface. Further, the CU 100 is connected to the 4G-CU by an X2 interface. The PDCP layer in the 4G-CU is an aggregation or split point when dual connectivity (DC) of 4G-5G is performed.

In addition, as illustrated in FIG. 1, between 4G-RU, carrier aggregation (CA) is performed and the DC is performed in the 4G-RU and the 5G-DU. Although not illustrated, a user entity (UE) 300 is wirelessly connected via the RF of the 4G-RU or the 5G-DU.

It should be noted that, FIG. 1 illustrates a radio network architecture at the time of the DC of an LTE-NR. However, even when the 4G-CU is split into the CU-DU or operates in an NR stand-alone manner, a similar radio network architecture may be used. When the 4G-CU is split into the CU-DU, functions related to the RRC layer and the PDCP layer may be moved to the 4G-CU and the layers below the RLC layer may be included in the 4G-DU. It should be noted that, a data rate of the CPRI may be reduced by the CU-DU splitting. In addition, a plurality of 5G-DUs may be connected to the 5G-CU.

Here, in the related art, since the physical layer to the RRC layer are closed and controlled in one node, information regarding each layer may be raised up and controlled in the RRC layer. However, in 5G, as illustrated in FIG. 1, the layers below the RLC layer are managed in the DU and the layers above the PDCP layer are managed in the CU. Therefore, since a situation of the layers below the RLC layer may not be determined in the RRC layer, it is difficult to perform appropriate control in accordance with a state of each layer below the RLC layer. On the other hand, in the layers in the DU, it is difficult to perform appropriate control in accordance with a RRC state.

Embodiment

Hereinafter, an embodiment will be described.

Figure 2:
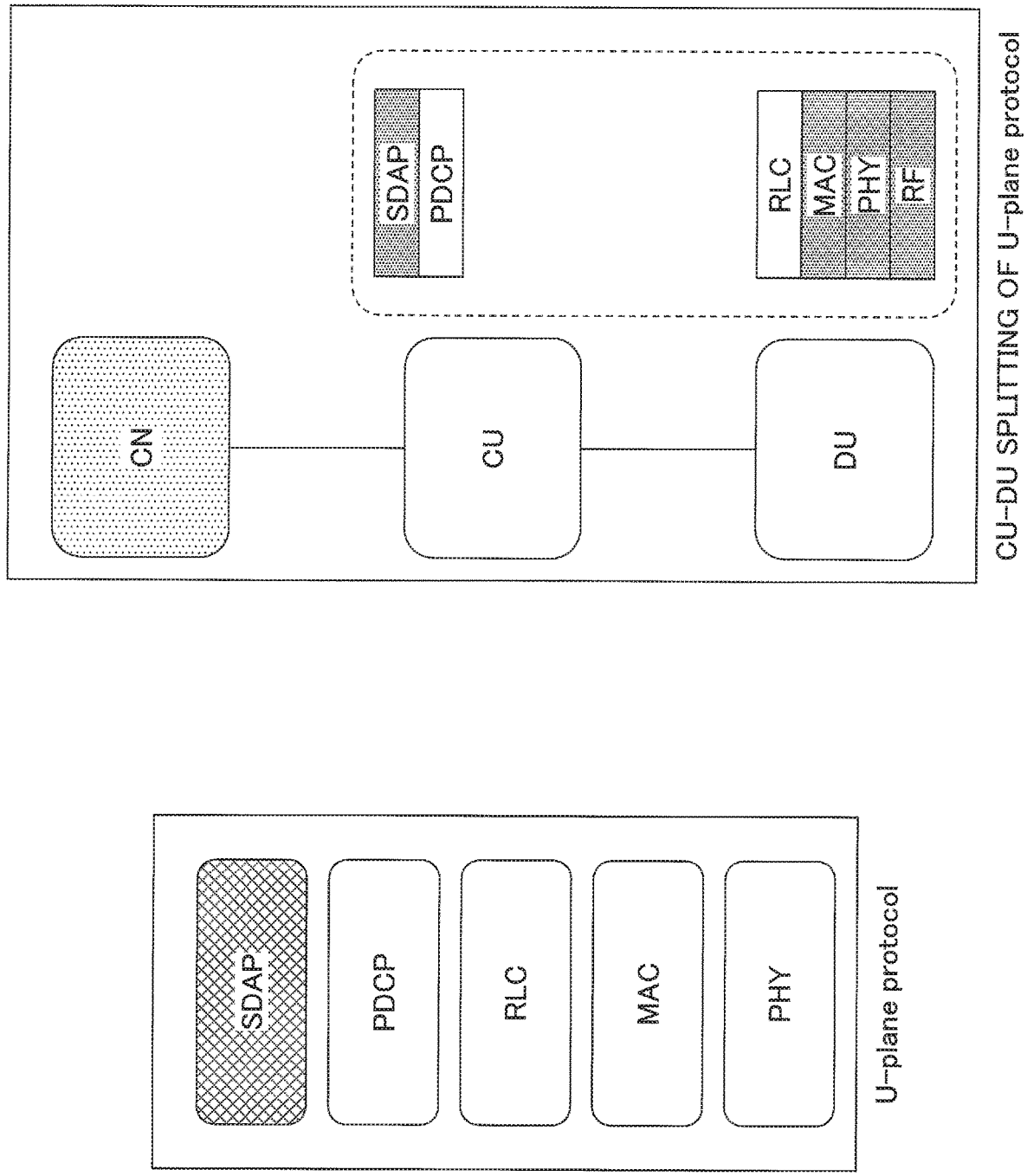
FIG. 2 is a diagram illustrating a structure example of a U-plane protocol stack according to the embodiment of the invention.

FIG. 2 is a diagram illustrating a structure example of a U-plane protocol stack according to the embodiment of the invention. A U-plane protocol stack and CU-DU splitting in 5G will be described with reference to FIG. 2.

As illustrated in FIG. 2, the U-plane protocol stack includes a PHY layer, a MAC layer, an RLC layer, a PDCP layer, and a service data adaptation protocol (SDAP) layer from lower layers. The SDAP layer is a layer that is applied to the case of a 5G core network and performs mapping of an IP flow and a radio bearer. When the CU-DU splitting is performed in 5G, the DU includes the RF, the PHY layer, the MAC layer, and the RLC layer and the CU includes the PDCP layer and the SDAP layer among the layers of the U-plane protocol stack. The CU is further connected to a core network (CN). That is, as illustrated in FIG. 2, the CU-DU splitting is performed between the RLC layer and the PDCP layer.

Figure 3:
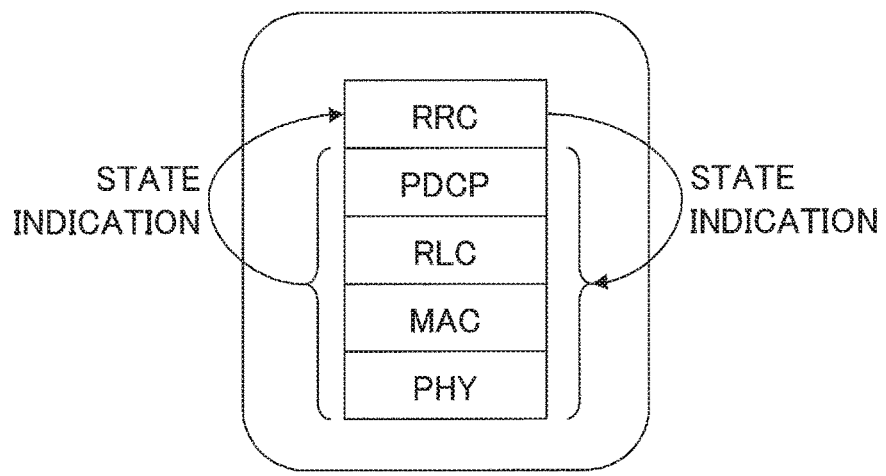
FIG. 3 is a diagram illustrating a structure example of layers.

FIG. 3 is a diagram illustrating a configuration example of layers. A structure example of a C-plane protocol stack will be described with reference to FIG. 3. As illustrated in FIG. 3, the C-plane protocol stack includes a PHY layer, a MAC layer, an RLC layer, a PDCP layer, and an RRC layer from lower layers. In FIG. 3, since no CU-DU splitting is performed, layers from the PHY layer to the RRC layer are controlled in one node. Accordingly, in the RRC layer, it is easy to perform a state indication mutually with each layer and perform control.

Figure 4:
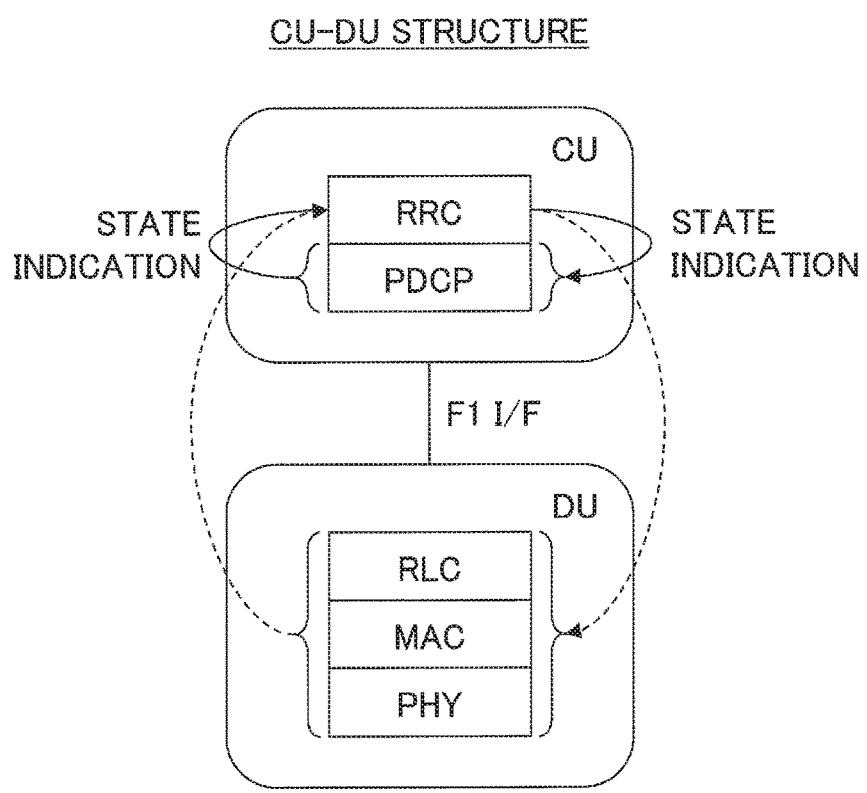
FIG. 4 is a diagram illustrating a structure example of the layers according to the embodiment of the invention.

FIG. 4 is a diagram illustrating a structure example of the layers according to the embodiment of the invention. A structure example at the time of the CU-DU splitting of the C-plane protocol stack will be described with reference to FIG. 4. As illustrated in FIG. 4, in the structure at the time of the CU-DC splitting, the DU 200 includes the PHY layer, the MAC layer, and the RLC layer and the CU 100 includes the PDCP layer and the RRC layer. In addition, the CU 100 and the DU 200 are connected via an F1 interface.

Here, when the RRC layer in the CU 100 performs the state indication mutually with the PDCP layer, it is easy to acquire and control information regarding the PDCP layer since the CU 100 includes both these layers. In contrast, when the RRC layer in the CU 100 performs the state indication mutually with the PHY layer, the MAC layer, or the RLC layer, it is difficult to acquire and control information regarding the PHY layer, the MAC layer, or the RLC layer since the DU 200 includes the PHY layer, the MAC layer, or the RLC layer.

Accordingly, there is consideration of indicating situations related to corresponding nodes to each other by using a network interface between the CU and DU.

For example, the DU 200 may indicate, to the CU 100, the following information. It should be noted that, the DU 200 and the UE 300 are assumed to be wirelessly connected.

(1) PHY Layer State or MAC Layer State of UE 300

(1-1) A synchronization state may be indicated. Examples of the synchronization state includes a radio connection state of the UE 300, a connection state of a cell or a beam, an uplink (UL) synchronization state, and a success or a failure of a random access (RA) procedure. In addition, when the DU 200 indicates, to the CU 100, a synchronization state NG, the CU 100 may determine that the UE 300 transitions to an out-of-service state and release a UE context (resources or the like related to the UE). By releasing the UE context, it is possible to avoid keeping unnecessary resources. In addition, when the UE 300 enters the synchronization state NG once and indicates, to the CU 100, the synchronization state NG and subsequently the DU 200 determines that the UE 300 enters a synchronization state OK or returns to a synchronization state, the DU 200 may indicate, to the CU 100, the synchronization state OK or the synchronization state return.

(1-2) A state related to discontinuous reception (DRX) or a timing alignment (TA) timer activation state (TA state of the UL) may be indicated. When radio resources of the UE 300 with which communication does not occur are preferentially opened to efficiently utilize resources in the CU 100, that is, when the UE 300 is caused to transition to an IDLE state, the DRX state or the TA timer activation state managed in the DU 200 may be indicated to the CU 100.

(1-3) A data activity (communication presence or absence) of the UE 300 may be indicated. When the DU 200 manages the data activity state of the UE 300, the DU 200 indicates, to the CU 100, a bearer or the UE 300 with which data communication is not performed for a predetermined period and the bearer or the UE 300 is released by the RRC layer of the CU 100. The data activity state may be managed and indicated in units of serving cells, units of cell groups, or units of MAC entities.

(2) RLC Layer State

When RLC retransmission excess occurs or a RLC protocol data unit (PDU) is not received for a predetermined period, this fact may be indicated to the CU 100 as a protocol error of the RLC and the CU 100 may re-establish the RLC layer (for example, intra-cell handover is activated).

It should be noted that, in the foregoing indication, an identifier of a logical channel (LCH), the UE 300, or the bearer may be indicated.

The indication transmitted from the DU 200 may be configured when the indication is performed from the CU 100. In addition, the DU 200 may indicate, to the CU 100, the fact that there is a capability to perform each of foregoing indications, as a capability.

The CU 100 or an operations administration and maintenance (OAM) indicates a parameter for triggering the foregoing indication in the DU 200, for example, an activity timer, a TA timer, or the like.

Figure 5:
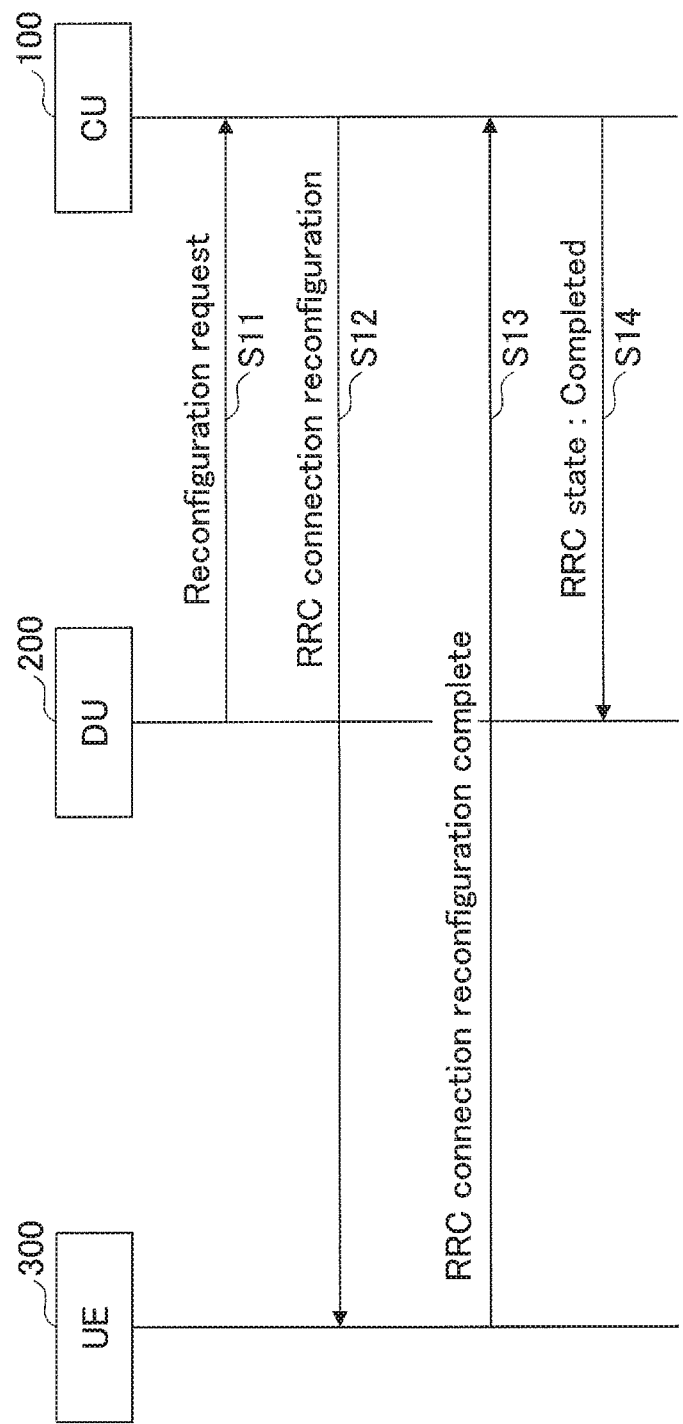
FIG. 5 is a sequence diagram for describing inter-node messages according to the embodiment of the invention.

FIG. 5 is a sequence diagram for describing inter-node messages according to the embodiment of the invention. FIG. 5 is a sequence illustrating information which is indicated to the DU 200 by the CU 100. A situation of the RRC reconfiguration related to the DU 200 may be indicated to the CU 100.

In step S11 illustrated in FIG. 5, the DU 200 indicates (transmits), to the CU 100, "Reconfiguration request" related to the RRC. Subsequently, the CU 100 indicates (transmits), to the UE 300, "RRC connection reconfiguration" (S12). Subsequently, the UE 300 indicates (transmits), to the CU 100, "RRC connection reconfiguration complete" (S13). In steps S12 and S13, the DU 200 performs an operation of relaying the RRC message. In step S14, the CU 100 indicates (transmits), to the DU 200, the RRC state including necessary information as "Completed."

For example, in step S14, since it is necessary for the DU 200 to determine that the UE 300 has completed the configuration in the RRC layer, the CU 100 may indicate to the DU 200 that the configuration in the UE 300 is completed or the configuration has failed. Since the DU 200 cannot directly determine that the configuration related to the RRC layer is completed in the UE 300, it is necessary to synchronize the RRC state by the indication (notification) from the CU 100.

In addition, for example, in step S14, the CU 100 may indicate, to the DU 200, SCell (DL/UL) configuration, TA group (sTAG), a transmission mode, quadrature amplitude modulation (xQAM), and the like. In the case of the configuration of the sTAG, corresponding configuration information, an identifier of a configuration procedure, or the like may be indicated. In addition, the CU 100 may indicate, to the DU 200, information regarding a scheduler operation such as a state related to in device coexistence (IDC) or the like.

In addition, for example, in step S14, the indication may be transmitted from the CU 100 to the DU 200 as a response to a request from the DU 200 in the case of the RRC reconfiguration of a trigger of the DU 200 illustrated in FIG. 5. That is, a response message may include information indicating "completion," "stop", or the like, of the RRC reconfiguration.

The information indicated by the CU 100, as described above, enables the DU 200 to determine the state of the RRC layer and appropriately control the layers below the RLC layer.

Figure 6:
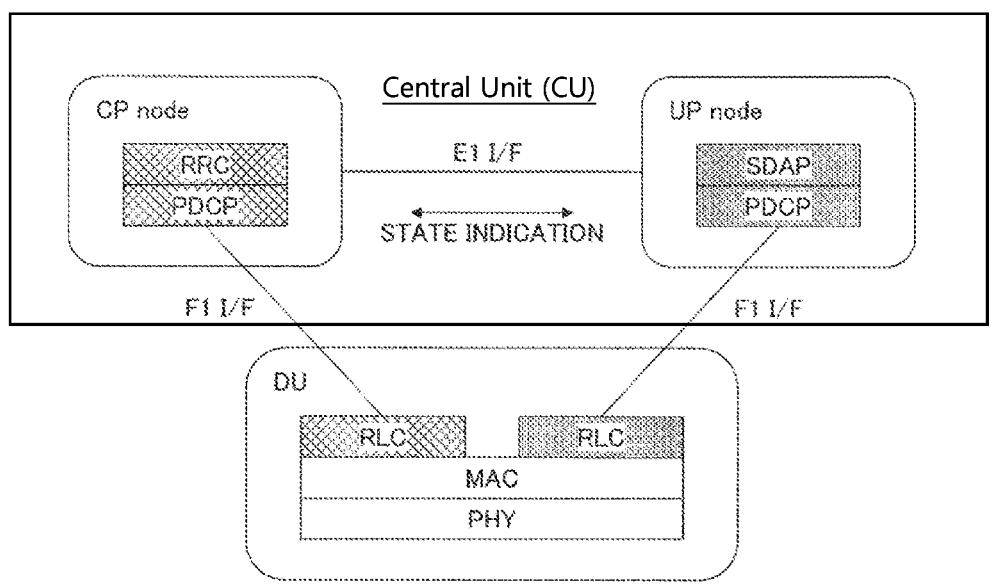
FIG. 6 is a diagram illustrating a structure example of a C-plane and a U-plane according to the embodiment of the invention.

FIG. 6 is a diagram illustrating a structure example of the C-plane and the U-plane according to the embodiment of the invention. An example in which nodes in the network are further split into a C-plane node and a C-plane node and a U-plane node will be described with reference to FIG. 6. As illustrated in FIG. 6, the CU 100 splits nodes into a "CP node" and an "UP node." The CP node includes the RRC layer and the PDCP layer. The UP node includes the SDAP layer and the PDCP layer. The CP node and the UP node are connected via an E1 interface and mutually perform state indication. The CP node and the UP node, and the DU are connected via F1 interfaces, respectively. It should be noted that, since the CP node and the DU node are logical nodes, the CP node and the DU node may be installed physically in the same node.

Since the RRC layer is managed by the C-plane node and the other layers are managed by the U-plane node, messages between the CU-DU described in FIGS. 4 and 5 may be indicated (transmitted) between the C-plane node and the U-plane node or the DU 200. Further, a notification related to the SDAP layer or the PDCP layer managed by the U-plane node may be transmitted to the C-plane node or the DU 200.

For example, the foregoing indicated inter-node message may include information indicating a COUNT rotation in the PDCP layer, an integrity verification failure, a robust header compression (ROHC) cyclic redundancy check (CRC) NG, or the like. In response to the message, the C-plane node performs a security change or re-establishment of the PDCP layer by, for example, intra-cell handover.

In the above-described embodiment, by mutually indicating the situations of the layers included in the nodes of the CU 100 and the DU 200 using the network interfaces, it is possible to acquires situations of the layers included in the other nodes and appropriately control the layers or the like of the own nodes.

That is, it is possible to perform appropriate control in accordance with the layer states between the nodes in the radio network architecture.

(Device Structures)

Next, functional structures of the CU 100, the DU 200, and the UE 300 performing the above-described processing and operations will be described. The CU 100, the DU 200, and the UE 300 each have at least functions of performing the embodiment. However, the CU 100, the DU 200, and the UE 300 may each have only some of the functions is the embodiment.

Figure 7:
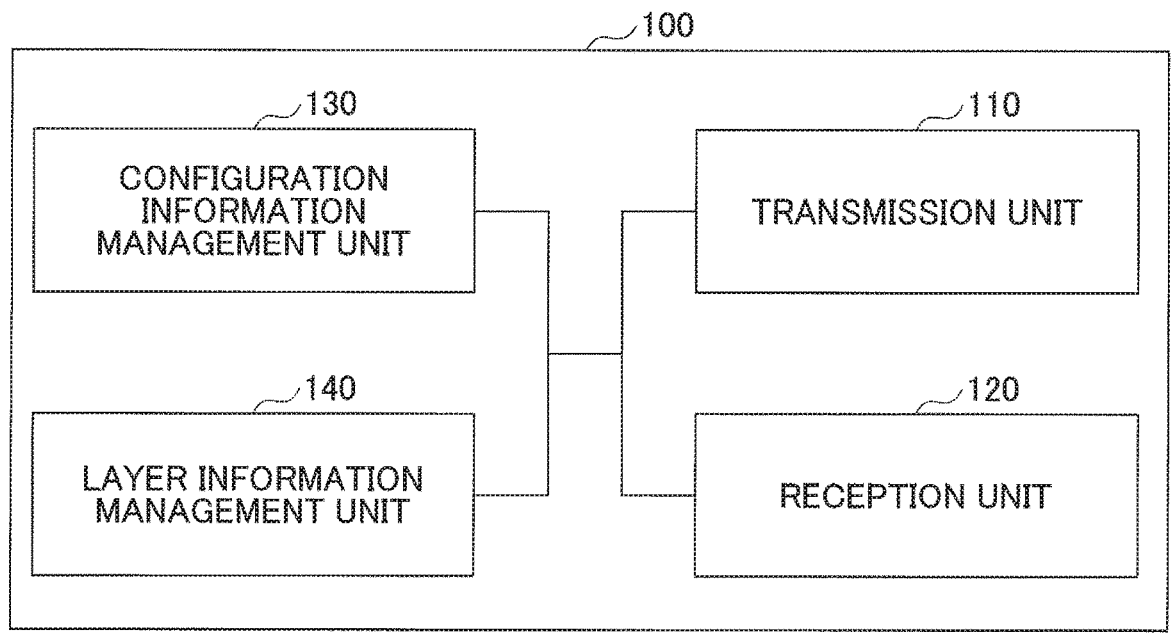
FIG. 7 is a diagram illustrating an example of a functional structure of a CU 100 according to the embodiment of the invention.

FIG. 7 is a diagram illustrating as example of a functional structure of the CU 100. As illustrated in FIG. 7, the CU 100 includes a transmission unit 110, a reception unit 120, a configuration information management unit 130, and a layer information management unit 140. The functional structure illustrated in FIG. 7 is merely exemplary. Any functional division and any name of the functional unit can be used as long as the operations according to the embodiment of the invention can be performed.

The transmission unit 110 has a function of generating a signal to be transmitted to the DU 200, another CU 100, or another network node and transmitting the signal. The reception unit 120 has a function of receiving various signals transmitted from, the DU 200, another CU 100, or another network node and acquiring information regarding, for example, higher layers from the received signals.

The configuration information management unit 130 stores preset configuration information. Examples of content of the configuration information include layer information and information regarding the RRC.

The layer information management unit 140 performs control of information regarding a layer state, as described in the embodiment.

Figure 8:
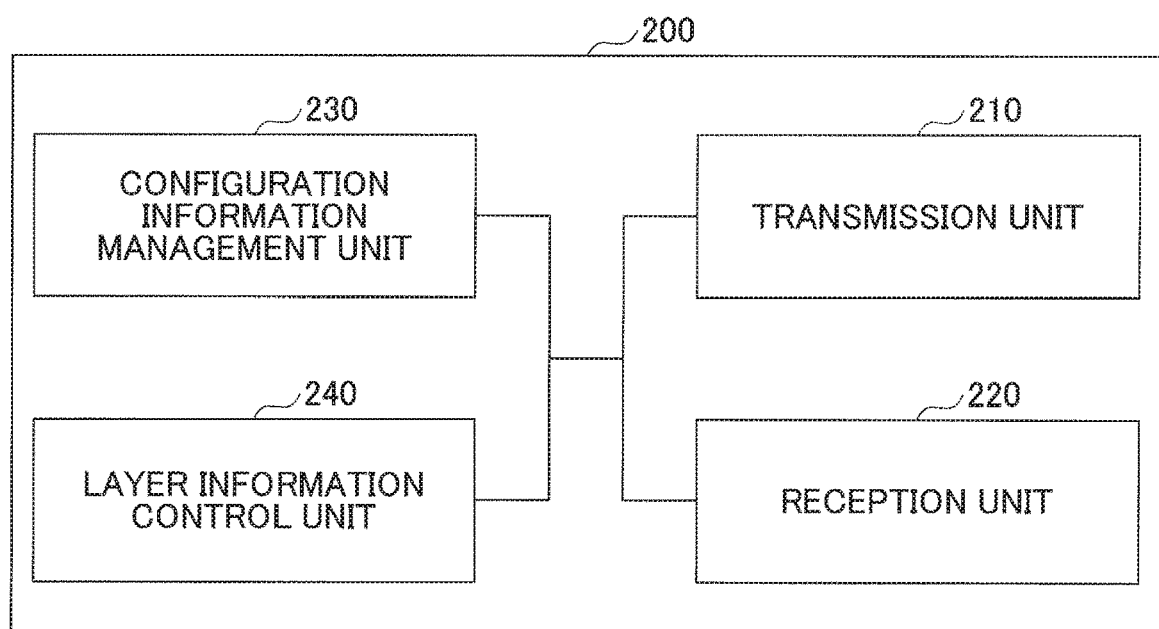
FIG. 8 is a diagram illustrating an example of a functional structure of a DU 200 according to the embodiment of the invention.

FIG. 8 is a diagram illustrating an example of a functional structure of the DU 200. As illustrated in FIG. 8, the DU 200 includes a transmission unit 210, a reception unit 220, a configuration information management unit 230, and a layer information control unit 240. The functional configuration illustrated in FIG. 8 is merely exemplary. Any functional division and any name of the functional unit can be used as long as the operations according to the embodiment of the invention can be performed.

The transmission unit 210 has a function of generating a signal to be transmitted to the UE 300 and wirelessly transmitting the signal. In addition, the transmission unit 210 has a function of transmitting a signal to the CU 100. The reception unit 220 has a function of receiving various signals transmitted from the UE 300 and acquiring information regarding, for example, higher layers from the received signals. In addition, the transmission unit 210 has a function of transmitting report information, control information, data, or the like to the UE 300.

The configuration information management unit 230 stores preset configuration information and various kinds of configuration information to be transmitted to the CU 100 or the UE 300. Examples of content of the configuration information include layer information, report information, and control information.

The layer information control unit 240 performs control of information regarding a layer state, as described in the embodiment.

Figure 9:
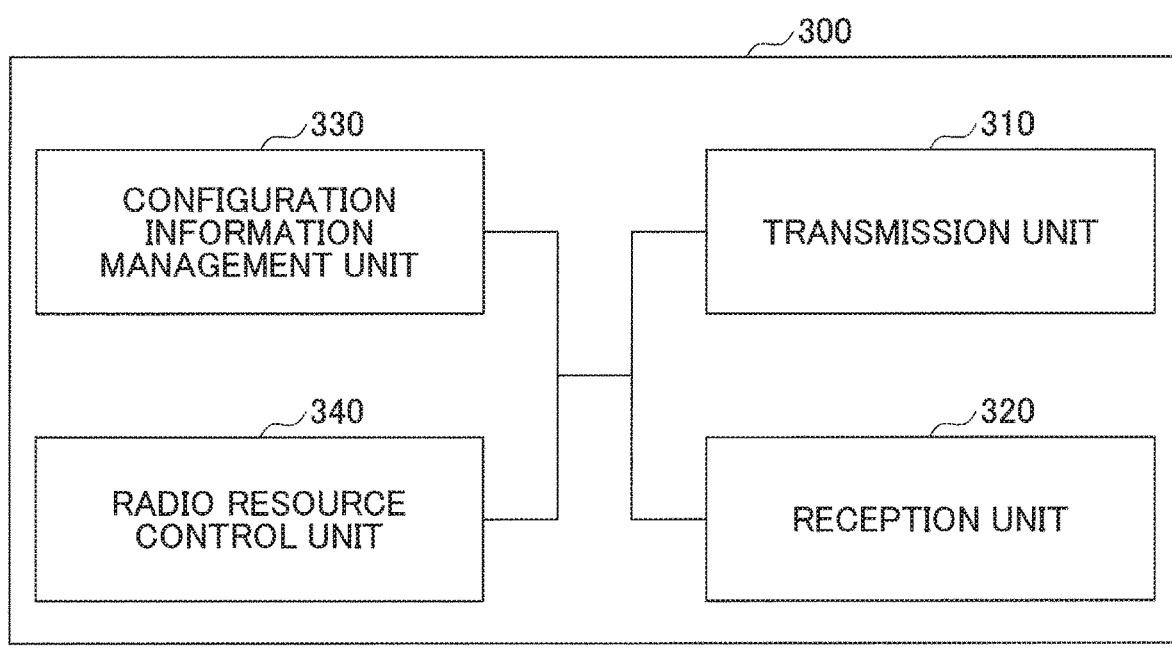
FIG. 9 is a diagram illustrating an example of a functional structure of a UE 300 according to the embodiment of the invention.

FIG. 9 is a diagram illustrating an example of a functional structure of the UE 300. As illustrated in FIG. 9, the UE 300 includes a transmission unit 310, a reception unit 320, a configuration information management unit 330, and a radio resource control unit 340. The functional structure illustrated in FIG. 9 is merely exemplary. Any functional division and any name of the functional unit can be used as long as the operations according to the embodiment of the invention can be performed.

The transmission unit 310 creates a transmission signal from transmission data and wirelessly transmits the transmission signal to the DU 200. The reception unit 320 wirelessly receives various signals from the DU 200 and acquires signals of the higher layers from the received signals of the physical layer. In addition, the reception unit 320 receives report information, control information, data, or the like from the DU 200. The configuration information management unit 330 stores various kinds of configuration information received from the DU 200 by the reception unit 320. The configuration information management unit 330 also stores preset configuration information. Examples of content of the configuration information include the information regarding various kinds of capability information of the UE 300.

The radio resource control unit 340 controls resources related to radio communication with the DU 200, as described in the embodiment. A functional unit related to reception of a control signal or the like in the radio resource control unit 340 may be included in the reception unit 320.

Hardware Structure

The diagrams of the functional structures (FIGS. 7, 8, and 9) used to describe the embodiment of the above-described invention illustrate blocks of functional units. The functional blocks (configuration units) are realized by any combination of hardware and/or software. In addition, realization means of each functional block is not particularly limited. That is, each functional block may be realized by one device in which a plurality of elements are joined physically and/or logically or may be realized by a plurality of devices in which two or more devices that are separated physically and/or logically are connected directly and/or indirectly (for example, a wired and/or wireless manner).

Figure 10:
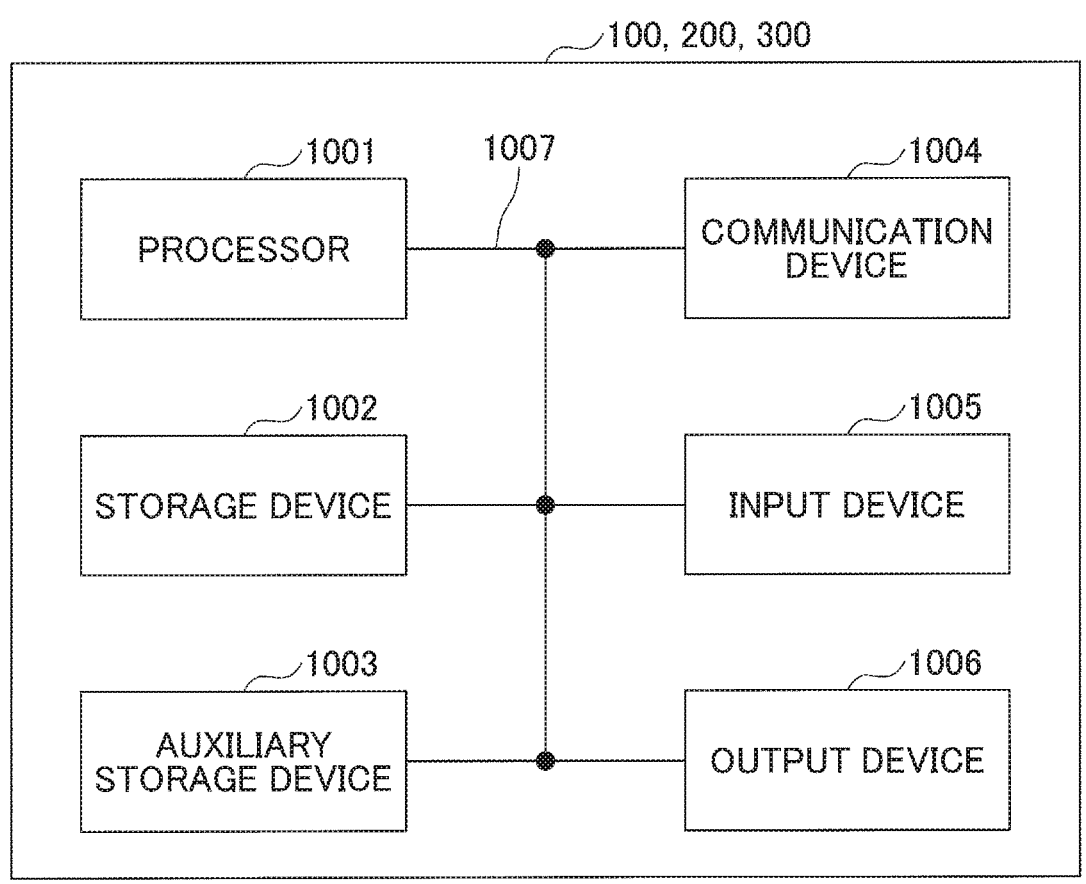
FIG. 10 is a diagram illustrating an example of a hardware structure of the CU 100, the DU 200, or the UE 300 according to the embodiment of the invention.

In addition, for example, all the CU 100, the DU 200, and the UE 300 according to an embodiment of the invention function as computers that perform the processing according to the embodiment of the invention. FIG. 10 is a diagram illustrating an example of a hardware structure of a communication device which is the CU 100, the DU 200, or the UE 300 according to the embodiment of the invention. Each of the CU 100, the DU 200, and the UE 300 described above may be configured as a computer device that physically includes a processor 1001, a storage device 1002, an auxiliary storage device 1003, a communication device 1004, an input device 1005, an output device 1006, a bus 1007, and the like.

It should be noted that, in the following description, a term "device" can be substituted with a circuit, a device, a unit, or the like. The hardware structure of the CU 100, the DU 200, and the UE 300 may be configured to include one device or a plurality of devices among devices denoted by reference numerals 1001 to 1006 illustrated in the drawing or may be configured not to include some of the devices.

Each function in the CU 100, the DU 200, and the UE 300 is realized by reading predetermined software (a program) on hardware such as the processor 1001, the storage device 1002, and the like so that the processor 1001 performs an operation and controlling communication of the communication device 1004 and reading and/or writing data in the storage device 1002 and the auxiliary storage device 1003.

The processor 1001 controls, for example, the entire computer by operating an operating system. The processor 1001 may be configured as a central processing unit (CPU) that includes an interface with a peripheral device, a control device, an operation device, a register, and the like.

In addition, the processor 1001 reads a program (a program code), a software module, or data from the auxiliary storage device 1003 and/or the communication device 1004 to the storage device 1002 and performs various kinds of processing in accordance with the program, the software module, or the data. As the program, a program causing a computer to execute at least some of the operations described in the above-described embodiment is used. For example, the transmission unit 110, the reception unit 120, the configuration information management unit 130, and the layer information management unit 140 of the CU 100 illustrated in FIG. 7 may be stored in the storage device 1002 and may be realized by a control program operated by the processor 1001. In addition, for example, the transmission unit 210, the reception unit 220, the configuration information management unit 230, and the layer information control unit 240 of the DU 200 illustrated in FIG. 8 may be stored in the storage device 1002 and may be realized by a control program operated by the processor 1001. In addition, for example, the transmission unit 310, the reception unit 320, the configuration information management unit 330, and the radio resource control wait 340 of the UE 300 illustrated in FIG. 9 may be stored in the storage device 1002 and may be realized by a control program operated the processor 1001. The above-described various kinds of processing performed by one processor 1001 have been described, but may be performed simultaneously or in sequence by two or more processors 1001. The processor 1001 may be mounted on one or more chips. It should be noted that, the program may be transmitted from a network via an electric communication line.

The storage device 1002 is a computer-readable recording medium and may be configured as at least one of, for example, a read-only memory (ROM), an erasable programmable ROM (EPROM), an electrically erasable programmable ROM (EPROM), a random access memory (RAM), and the like. The storage device 1002 may be called a register, a cache, a main memory (a main memory device), or the like. The storage device 1002 can store a program (a program code), a software module, or the like which can be executed to perform processing according to an embodiment of the invention.

The auxiliary storage device 1003 is a computer-readable recording medium and may be configured as at least one of, for example, an optical disc such as a compact disc ROM (CD-ROM), a hard disk drive, a flexible disc, a magneto-optical disc (for example, a compact disc, a digital versatile disc, a Blu-ray (registered trademark) disc), a smart card, a flash memory (for example, a card, a stick, a key drive), a floppy (registered trademark) disk, a magnetic strip, and the like. The auxiliary storage device 1003 may be called an auxiliary storage device. The above-described storage medium may be, for example, a database including the storage device 1002 and/or the auxiliary storage device 1003 or an appropriate medium other than a server.

The communication device 1004 is hardware (a transceiving device) that performs communication between computers via a wired and/or wireless network and is also referred to as, for example, a network device, a network controller, a network card, a communication module, or the like. For example, the transmission unit 110 and the reception unit 120 of the CU 100 may be realized in the communication device 1004. In addition, the transmission unit 210 and the reception unit 220 of the DU 200 may be realized in the communication device 1004. The transmission unit 310 and the reception unit 320 of the UE 300 may be realized in the communication device 1004.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. It should be noted that, the input device 1005 and the output device 1006 may be an integrated configuration (for example, a touch panel).

In addition, each of the devices such as the processor 1001 and the storage device 1002 are connected via the bus 1007 to communicate information. The bus 1007 may be configured as a single bus or may be configured as different buses between the devices.

In addition, the CU 100, the DU 200, and the UE 300 may each include hardware such as a microprocessor, a digital signal processor (DSP), an application specific integrated circuit (ASIC), a programmable logic device (PLD), and a field programmable gate array (FPGA) or some or all of the functional blocks may be realized by the hardware. For example, the processor 1001 may be mounted as at least one of the hardware.

Conclusion of Embodiment

As described above, according to an embodiment of the invention, there is provided a network node that is a second network node connected to a user device and a first network node. The network node includes: a control unit that acquires information regarding a layer which terminates between the user device and the second network node; and a transmission unit that transmits the information regarding the layer to the first network node. The layer is a network node which does not terminate between the user device and the first network node.

In the foregoing configuration, it is possible to perform appropriate control in accordance with layer states between the nodes in a radio network architecture.

The information regarding the layer may include at least one of pieces of information indicating states of a PHY layer, a MAC layer, or an RLC layer. In the foregoing configuration, the DU 200 can indicate, to the CU 100, information regarding the states of the PHY layer, the MAC layer, and the RLC layer.

When the information indicating the states of the PHY layer, the MAC layer, or the RLC layer includes information indicating a synchronization state with the user device and the information indicating the synchronization state indicates non-synchronization, the first network node may releases a resource of the RRC layer of the user device. In the foregoing configuration, the DU 200 can release unnecessary RRC resources for the CU 100.

The information regarding the layers may include at least one of pieces of information indicating states of an RRC layer, a PDCP layer, or an SDAP layer. In the foregoing configuration, the CU 100 can indicate, to the DU 200, the information regarding the states of the RRC layer, the PDCP layer, and the SDAP layer.

The information indicating the state of the RRC layer may include information indicating whether the user device has completed configuration of the RRC layer.

In addition, according to the embodiment of the invention, there is provided a communication system including a user device, and a second network node and a third network node connected to a first network node. The second network node includes a management unit that acquires information regarding a layer which terminates in a C-plane between the user device and the second network node and a transmission unit that transmits the information regarding the layer which terminates in the C-plane to the first network node. The layer which terminates in the C-plane does not terminate between the user device and the first network node. The third network node includes a management unit that acquires information regarding a layer which terminates in a U-plane between the user device and the third network node and a transmission unit that transmits the information regarding the layer which terminates in the U-plane to the first network node. The layer which terminates in the U-plane does not terminate between the user device and the first network node.

In the foregoing configuration, it is possible to perform appropriate control in accordance with layer states between the nodes in a radio network architecture. In addition, it is possible to perform appropriate control in accordance with the layer states between the nodes in which the C-plane and the U-plane are split in the radio network architecture.

Supplements of Embodiment

The embodiments of the invention have been described above, but the disclosed invention is not limited to the embodiments and various modified examples, corrected examples, substituted examples, displaced examples, and the like can be understood by those skilled in the art. The description has been made using the specific numerical value examples is order to promote the understanding of the invention, but theses numerical values are merely exemplary and any appropriate values may be used unless otherwise stated. The division of the items in the foregoing description is not essential for the invention, the factors described in two or more items may be combined and used as necessary and the factors described in certain items may be applied to the factors described in the other items (unless inconsistent). The boundaries of the functional units or the processing units in the functional block diagrams not necessarily correspond to boundaries of physical components. The operation of a plurality of functional units may be performed physically by one component or the operation of one functional unit may be performed physically by a plurality of components. The procedure of the processing described in the embodiments may be switched unless the processing procedure is inconsistent. To facilitate the description of processing, the CU 100, the DU 200, and the UE 300 have been described with reference to the functional block diagrams, but these devices may be realized by hardware, software, or a combination thereof. Software operated by the processor included in the CU 100 or the DU 200 according to the embodiment of the invention and software operated by the processor included in the UE 300 according to the embodiment of the invention may each be stored in a random access memory (RAM), a flash memory, a read-only memory (ROM), an EPROM, an EEPROM, a register, a hard disk (HDD), a removable disc, a CD-ROM, a database, or any appropriate storage medium other than a server.

In addition, the indication of the information may be performed in accordance with another method without being limited to the mode/embodiment described in the present specification. For example, the notification of the information may be performed with physical layer signaling (for example, downlink control information (DCI) or uplink control information (UCI)), higher layer signaling (for example, radio resource control (RRC) signaling, a medium access control (MAC) signaling, broadcast information (master information block (MIB) or system information block (SIB)), and other signal or a combination thereof. In addition, the RRC signaling may be called an RRC message and may be, for example, RRC connection setup message, an RRC connection reconfiguration message, or the like.

Each mode/embodiment described in the present specification may be applied to a system using Long Term Evolution (LTE), LTE-Advanced (LTE-A), SUPER 3G, IMT-Advanced, 4G, 5G, Future Radio Access (FRA) W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, Ultra-Wide Band (UWB), Bluetooth (registered trademark), or another appropriate system and/or a next-generation system extended based thereon.

A sequence of the processing procedure, the sequence, the flowchart, and the like of each mode/embodiment described in the present specification may be switched unless inconsistent. For example, the methods described in the present specification suggest elements of various steps in the exemplary sequences and the invention is not limited to the suggested specific sequences.

A specific operation performed by the CU 100 of the DU 200 in the present specification is also performed by an upper node thereof depending on a case. In a network formed one network node or a plurality of network nodes including the CU 100 and the DU 200, it is apparent that various operations performed to communicate with the UE 300 can be performed by the CU 100 or the DU 200 and/or another network node (for example, MME, S-GW, or the like is considered, but it is not limited thereto) other than the CU 100 or the DU 200. A case in which the number of other network nodes other than the CU 100 and the DU 200 is one has been exemplified above, but a plurality of other network nodes (for example, MME and S-GW) may be combined.

Each mode/embodiment described is the present specification may be used singly, may be used in combination, or may be switched in association with performance.

The UE 300 is also called a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or another appropriate term by those skilled in the art in some cases.

The CU 100 and the DU 200 are also called a NodeB (NB), an enhanced NodeB (eNB), a gNB, a base station, or another appropriate term by those skilled in the art in some cases.

The term "determining" used in the present specification includes diverse operations in some cases. The "determining" can include the fact that, for example, judging, calculating, computing, processing, deriving, investigating, looking up (for example, looking up in a table, a database, or another data structure), or ascertaining is considered to be "determining." In addition, the "determining" can include the fact that receiving (for example, receiving information), transmitting (for example, transmitting information), input, output, or accessing (for example, accessing data in a memory) is considered to be "determining." In addition, the "determining" can include the fact that resolving, selecting, choosing, establishing, or comparing is considered to be "determining." That is, the "determining" can include the fact that any operation is considered to be "determined."

The description "based on" used in the present specification does not mean "based on only" unless otherwise stated. In other words, the description "based on" means both "based on only" and "based on at least."

The terms "include," "including", and modifications thereof are intended to be comprehensive similarly to the term "comprising" as long as the terms are used in the present specification and the claims. Further, the term "or" used in the present specification or the claims is intended not to be exclusive OR.

In the entire present disclosure, for example, when the articles such as a, an, and the in English are added in translation, the articles can include a plurality of articles unless clearly stated in the contexts.

It should be noted that, in the embodiments of the invention, the CU 100 or the DU 200 is an example of a network node. The UE 300 is an example of a user device. The layer information management unit 140 is an example of a management unit or a control unit. The layer information control unit 240 is an example of the control unit.

The invention has been described in detail above, but it is apparent to those skilled in the art that the invention is not limited to the embodiments described in the present specification. The invention can be embodied in correction and modification aspects without departing from the gist and the scope of the invention described in the claims. Accordingly, the description of the present specification has been made for exemplary description and does not have any limited meaning to the invention.

This international patent application is based on and claims priority to Japanese Patent Application No. 2017-189214, filed on Sep. 28, 2017, and the entire content of Japanese Patent Application No. 2017-189214 is incorporated herein by reference.

Explanations of Letters or Numerals

100 CU
200 DU
300 UE
110 TRANSMISSION UNIT
120 RECEPTION UNIT
130 CONFIGURATION INFORMATION MANAGEMENT UNIT
140 LAYER INFORMATION MANAGEMENT UNIT
210 TRANSMISSION UNIT
220 RECEPTION UNIT
230 CONFIGURATION INFORMATION MANAGEMENT UNIT
240 LAYER INFORMATION CONTROL UNIT
310 TRANSMISSION UNIT
320 RECEPTION UNIT
330 CONFIGURATION INFORMATION MANAGEMENT UNIT
340 RADIO RESOURCE CONTROL UNIT
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A network node that is a Distributed Unit (DU) connected to a user device and a Central Unit (CU), the DU comprising:
  a reception unit configured to receive information regarding a Radio Resource Control (RRC) layer terminated between the user device and the CU from the CU; and
  a control unit configured to acquire an RRC reconfiguration complete indicator from the information regarding the RRC layer terminated between the user device and the CU via the DU,
  wherein the information regarding the RRC layer terminated between the user device and the CU at least includes the RRC reconfiguration complete indicator, the RRC reconfiguration complete indicator indicating whether the user device has completed configuration of the RRC layer, and
  wherein the CU includes a service data adaptation protocol (SDAP) layer.

2. A communication system comprising:
  a user device; and
  a Central Unit Control Plane (CU-CP) and a Central Unit User Plane (CU-UP) connected to a Distributed Unit (DU) and the user device,
  wherein the CU-CP includes a management unit configured to acquire information regarding a Packet Data Convergence Protocol (PDCP) layer which is terminated in a C-plane between the user device and the CU-CP via the DU,
  wherein the CU-UP includes a management unit configured to acquire information regarding a PDCP layer terminated in a U-plane between the user device and the CU-UP via the DU,
  wherein the DU includes:
    a reception unit configured to receive information regarding a Radio Resource Control (RRC) layer terminated in a C-plane from the CU-CP; and
    a control unit configured to acquire an RRC reconfiguration complete indicator from the information regarding the RRC layer terminated in a C-plane,
  wherein the information regarding the RRC layer terminated in a C-plane at least includes the RRC reconfiguration complete indicator, the RRC reconfiguration complete indicator indicating whether the user device has completed configuration of the RRC layer, and
  wherein the CU-UP includes a service data adaptation protocol (SDAP) layer.

* * * * *